2,898,490
TARGET PLATE

Richard W. Damon, Schenectady, N.Y., assignor to General Electric Company, a corporation of New York No Drawing. Application December 23, 1957
Serial No. 704,357

7 Claims. (Cl. 313—65)

This invention relates to a target plate particularly adapted for use in an X-ray sensitive vidicon tube and having an anodized aluminum substrate, and to a method of manufacturing such plate.

The lightness of weight, high electrical conductivity and high X-ray transparency of aluminum make it an ideal substrate for the support of the lead oxide which has proved to be the best photoconductive coating for a target plate of the character described. However, aluminum substrate plates coated with lead oxide have not given good results in vidicon tubes used in closed circuit TV used to render X-ray images visible. The images have been spotty and blurred due to the fact that aluminum oxide formed at the interface between the aluminum substrate and the lead oxide has non-uniform and unduly high resistance to the passage of electrical current. It has been found difficult to plate the aluminum substrate with other metals having oxides or lead salts which would be more satisfactory in this connection, as manufacturing methods involve the use of considerable heat, and there has been a tendency for the plated metal to peel from the aluminum substrate sheet.

The present invention solves the problem by anodizing the aluminum as a step preliminary to plating upon the anodized surface, metals whose lead salts and/or oxides are relatively highly conductive of electricity and produce satisfactorily uniform results. The anodizing produces a spongy or open pored coating on the aluminum substrate sheet. Such metals as chromium, zinc, tin, cadmium, lead, copper, nickel and stainless steel can be plated on the anodized surface of an aluminum sheet in very thin plies without danger of peeling. All of these metals have lead salts and oxides which are relatively highly conductive, an electrical bulk resistivity not exceeding $10^{10}$ ohm/cm. being desired.

Upon the plated film of one of these metals the lead oxide photoconductive coating can be deposited by condensation from a vapor and the lead oxide is then desirably converted to a yellow crystalline form by prolonged baking as disclosed in the companion application of Berger and Jacobs entitled Improved Target For X-Radiation and the Like.

The first step of the present method invloves the anodizing of the aluminum substrate sheet, the dimensions and thickness of which are determined entirely by the requirements of the use to which it should be put. The present invention is not concerned with dimensions. As already pointed out, the anodizing produces an oxidized surface characterized by a spongy and open porous structure, the porous oxide being firmly adherent to the face of the sheet.

The anodized sheet is now electroplated with a thin film of any metal whose co-efficient of expansion is sufficiently close to that of the aluminum substrate sheet and to the lead oxide, and whose oxide and/or lead salt is electrically conductive, with a bulk resistivity which does not exceed $10^{10}$ ohm/cm. Chromium is preferred and zinc, tin, cadmium, lead, nickel, copper and stainless steel are examples of other suitable metals.

As disclosed in the companion application of Berger and Jacobs above identified, the plated substrate sheet is then raised to a temperature desirably exceeding 200° C. but well below the vapor point of lead oxide, while in partial vacuum and in the presence of oxygen. Under these conditions the plated sheet is exposed to the vapor of lead oxide. The lead oxide vapor condenses on the substrate sheet to form deposits of both the red and yellow forms of lead oxide. The lead oxide coated substrate sheet is then baked in air for a period sufficiently long and at a temperature sufficiently high to convert substantially all of the lead oxide to the yellow crystalline form. One or more additional deposits of lead oxide may be superimposed on the first deposit and baked to produce any desired thickness of yellow lead oxide coating.

During the baking operation, and to some extent preceding the baking operation, oxides of the plating metal and lead salts of the plating metal tend to form at the interface between the lead oxide and the metal film plated on the surface of the substrate sheet. For the purposes of the present invention, it is important that these oxides and/or salts be materially more conductive electrically than the lead oxide itself. It is very important, moreover, that the electrical conductivity be uniform throughout the interface. All of these objectives are achieved by the methods and materials herein disclosed. The resulting target plate used in an X-icon tube for the purposes described gives exceptionally clear reproduction of the image of work projected by X-radiation upon the target plate. A film of chromium in particular, when plated on an anodized aluminum sheet, gives an image which is entirely blemish free.

I claim:

1. As a new article of manufacture, a target plate for use in an X-ray sensitive vidicon tube and the like, said plate comprising an aluminum substrate sheet having an anodized porous oxide facial surface, a metallic film bonded to said porous surface and comprising a metal whose lead salts and oxides are electrically conductive with not to exceed $10^{10}$ ohm/cm. resistivity, and a lead oxide coating on the surface of said film, said film having an oxide of the metal of said film uniformly distributed at the interface between the metallic film and the lead oxide.

2. The target plate defined in claim 1 in which the film is selected from a group of metals which consists of chromium, zinc, tin, cadmium, lead, copper, nickel and stainless steel.

3. The method of making a target plate having an aluminum substrate sheet and a lead oxide coating, said method comprising the steps of anodizing a surface of the aluminum substrate sheet; depositing upon, and bonding to, the said anodized surface a film of metal whose oxides and lead salts have electrical resistivity not exceeding $10^{10}$ ohm/cm.; and thereafter coating said film with lead oxide.

4. The method of claim 3 in which the depositing and bonding of the metal film upon the anodized surface is effected by electroplating the anodized surface with sufficient metal to provide said film.

5. The method of claim 4 in which the surface of the electroplated metallic film is oxidized by baking it at high temperature after it has been coated with lead oxide.

6. The method of claim 4 in which the metal electroplated on the anodized aluminum substrate sheet to provide said film is selected from a group of metals which consists of chromium, zinc, tin, cadmium, lead, copper, nickel and stainless steel.

7. A method of making a target plate comprising an aluminum substrate sheet and a lead oxide coating; which method comprises anodizing a face of the aluminum substrate sheet to provide a porous oxide fixed on said sheet; electroplating the anodized face of said sheet with chromium to provide a surface film securely bonded through said porous oxide to said sheet by electrodeposit; heating the sheet in oxygen at subatmospheric pressure at temperatures below the vaporization point of lead oxide; exposing the heated sheet to lead oxide vapor and thereby condensing lead oxide upon the sheet in the red and yellow lead oxide form; and thereafter baking the sheet at temperatures sufficiently high to convert all lead oxide to its yellow crystalline form while oxidizing the chromium at the interface between the chromium film and the lead oxide crystals.

References Cited in the file of this patent

UNITED STATES PATENTS

| | | |
|---|---|---|
| 2,240,186 | Iams | Apr. 29, 1941 |
| 2,495,941 | Mondelfo | Jan. 31, 1950 |
| 2,588,019 | Law | Mar. 4, 1952 |
| 2,637,686 | McKay | May 5, 1953 |